United States Patent [19]
Whiddon

[11] Patent Number: 5,160,113
[45] Date of Patent: Nov. 3, 1992

[54] MOUNT FOR DRIVE MEANS AND SPEED CONTROL MEANS

[75] Inventor: Richard Whiddon, Greenville, S.C.

[73] Assignee: Reliance Electric Industrial Company, Greenville, S.C.

[21] Appl. No.: 744,878

[22] Filed: Aug. 14, 1991

Related U.S. Application Data

[63] Continuation of Ser. No. 491,111, Mar. 9, 1990, abandoned.

[51] Int. Cl.⁵ ............................................. F16M 1/00
[52] U.S. Cl. ........................................ 248/638; 248/639
[58] Field of Search ............... 248/638, 639, 678, 666, 248/672

[56] References Cited

U.S. PATENT DOCUMENTS

| | | | |
|---|---|---|---|
| 1,546,968 | 7/1925 | Chandler | 248/639 |
| 1,886,035 | 11/1932 | Mann | 248/639 |
| 3,248,077 | 4/1966 | Charles | 248/678 X |

FOREIGN PATENT DOCUMENTS 84241 7/1935 Sweden ........................... 248/639

*Primary Examiner*—Alvin C. Chin-Shue
*Attorney, Agent, or Firm*—Dority & Manning

[57] ABSTRACT

A mounting frame is disclosed for supporting a speed control device and a drive source in operative relationship. The frame is preferably of U-shape configuration having spaced apart, parallel legs which define a section in a first plane for mounting receipt of one of said drive source and said speed control device, and a second section for cantilever support from said first section when installed, said second section of said legs being located in a different plane than said first section of said legs and being adapted for mounting receipt of the other of said drive source and said speed control device. The second cantilevered section of said legs is not supported from said one of said drive source and said speed control device, and the mounting structure precludes reaching of the resonant frequency of the drive source support structure during the operating range of same or significant transfer of vibration from one of said drive source and said speed control device to the other.

7 Claims, 2 Drawing Sheets

MOUNT FOR DRIVE MEANS AND SPEED CONTROL MEANS

This is a continuation of application Ser. No. 07/491,111, filed Mar. 9, 1990, now abandoned.

BACKGROUND OF THE INVENTION

The present invention relates to an improved mounting device for a power source such as a motor and a speed control device such as a gear reducer or the like.

Many different arrangements have heretofore been employed for mounting of drive motors and gear reducers for operative connection to industrial equipment to be driven thereby. Such prior arrangements, however, have been fraught with numerous problems exemplified by initial alignment of the motor or other power source with respect to the reducer or other speed control device, damage to alignment when the units are located on site resulting from contact by mechanized equipment in the area, undue damage to the components resulting from vibration, and the like. Particularly, vibrations induced during operation can lead to serious problems, creating stress on the components which could lead to fatigue and/or failure of bearings or other damage to either the motor or the reducer.

One conventional commercial arrangement combines an electric motor and a gear reducer, and for the most part is relatively simple. For example, motors and thus associated reducers have been located on separate mounting pad which are fastly secured to the floor or some other support surface. Such an arrangement is not only more time consuming during installation, but also dictates the need of adequate support area to receive both the motor and the reducer.

In another prior structure, the motor, for example, is mounted directly to the reducer housing, with the reducer directly supporting the motor. In some environs, the location where the motor and gear reducers are to be mounted is adequate for receipt of both. Hence, in a further prior mounting arrangement, referred to as a "scoop mount", brackets are secured to the reducer housing and extend outwardly therefrom, with the motor secured to the brackets and thus cantilevered from the gear reducer.

In instances where the motor is directly secured to the reducer housing or to the scoop mounting brackets, vibrations may be induced during operating times. In such arrangements, particularly in larger reducer-motor combinations, the resonant frequency of the motor/reducer combination may lie within the normal operating speed of the motor, and, if reached, the motor bearings will be destroyed. Such resonant frequency problems can sometimes be overcome by including angled stiffeners to the scoop mounting brackets when small reducer-motors are employed. When, however, larger units are present, the stiffness of the gear box is low enough that no matter how much the scoop is stiffened, damage may still result.

Also, during continuous and long term operation of a motor and gear reduction combination, stress may be produced by vibrations which though short of the resonant frequency, may adversely affect the motor bearings, or the motor mounting structure, eventually leading to fatigue failure.

Prior art mounting devices and arrangements such as those enumerated above are all subject to conditions which can lead to problems exemplified by bearing failure, cracking of housings, oil leakage, undue wear and deterioration of seals, gaskets, and the like.

With a mounting arrangement according to the present invention, however, the problems noted above are either not present or are significantly reduced, and there is no known prior art that is believed to anticipate or suggest the present invention.

SUMMARY OF THE INVENTION

Generally speaking, the present invention relates to an improved mounting means for a drive means such as a motor and a speed control means such as a gear reducer operatively associated therewith, and comprises a structural frame, said frame having a first section located in a first plane and being adapted for receiving one of said drive means or said speed control means thereat, said frame further having a second section integral with said first section and extending outwardly therefrom, said second section being adapted for receipt of the other of said drive means or said speed control means, said second section being located in a horizontal plane different from the plane of said first section, whereby said drive means and said speed control means will be independently supported by said frame and vibration of one of said drive means and said speed control means will not be imparted to the other.

More specifically, a mounting structure according to the present invention preferably includes a structural frame which includes a pair of spaced apart legs or members defining the first section, and to which a speed control means such as a gear reducer may be affixed for transport. The legs or members extend outwardly away from the first section and define a second section which is located above or below the first section and is adapted to receive a drive motor for the gear reducer. The legs defining the second section may or may not have cross bracings or other connecting support elements, depending on the dictates of the overall assembly. For instance, with a gear reducer secured to the legs during transport, the connections therebetween maintains integrity, of the legs. When on site for installation, bolts employed for shipment may be removed after the reducer is secured to the structure and the floor, etc. at the first section. The drive motor is normally secured to a mounting plate and the mounting plate is secured to the armlegs defining the second section so as to be in proper operative alignment for connection to the gear reducer. Such securement further provides integrity on the frame. Alternatively, as noted above, the frame may be unitized by the inclusion of cross bracing members. One of the frame sections is located in a different plane from the other. The lower plane section is secured to a support surface on site with the upper plane surface being cantilevered therefrom.

Therefore, it is an object of the present invention to provide an improved mounting means for a drive means and a speed control means.

Another object of the present invention is to provide a mounting frame for a drive motor and a speed control means that precludes the motor from reaching the resonant frequency of its mounting structure during normal operating speeds.

Yet another object of the present invention is to provide a mounting means for a drive motor and a speed control means where one of the two units is secured to a cantilevered mounting means.

Still further, another object of the present invention is to provide an improved mounting frame for receiving a drive motor and a speed control means thereon for operative association therewith, and where at least one of the two units may be secured thereto for transport to an installation site.

BRIEF DESCRIPTION OF THE DRAWINGS

The invention will be more readily understood from a reading of the following specification and by reference to the accompanying drawings forming a part thereof, wherein an example of the invention is shown and wherein.

DESCRIPTION OF PREFERRED EMBODIMENTS

Figure 1:
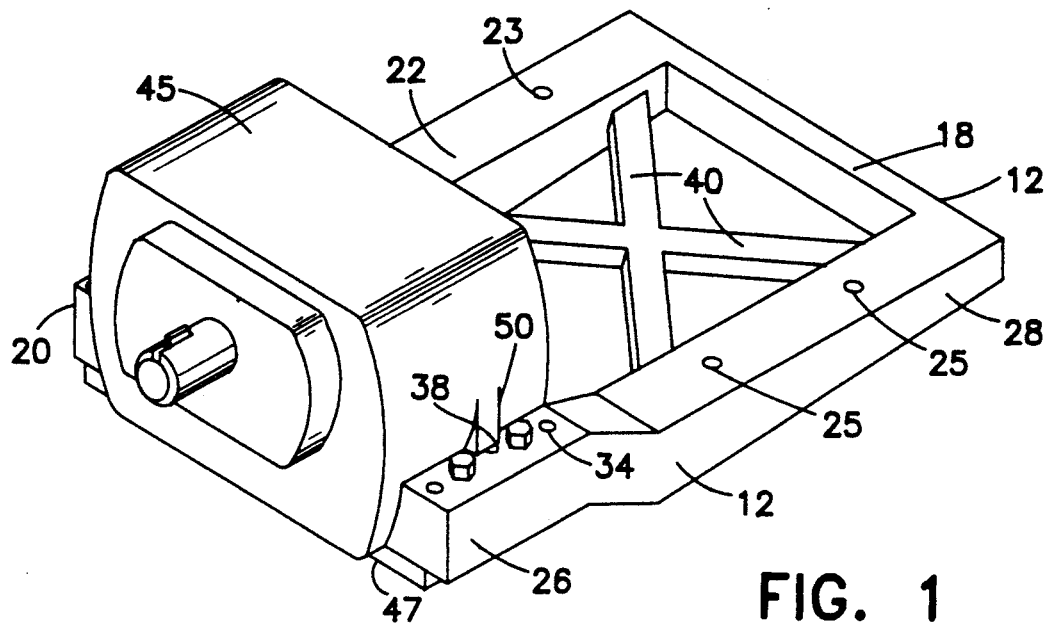
FIG. 1 is an isometric view of a mounting means according to the present invention showing schematically a typical speed control device mounted thereon for transport.
Figure 3:
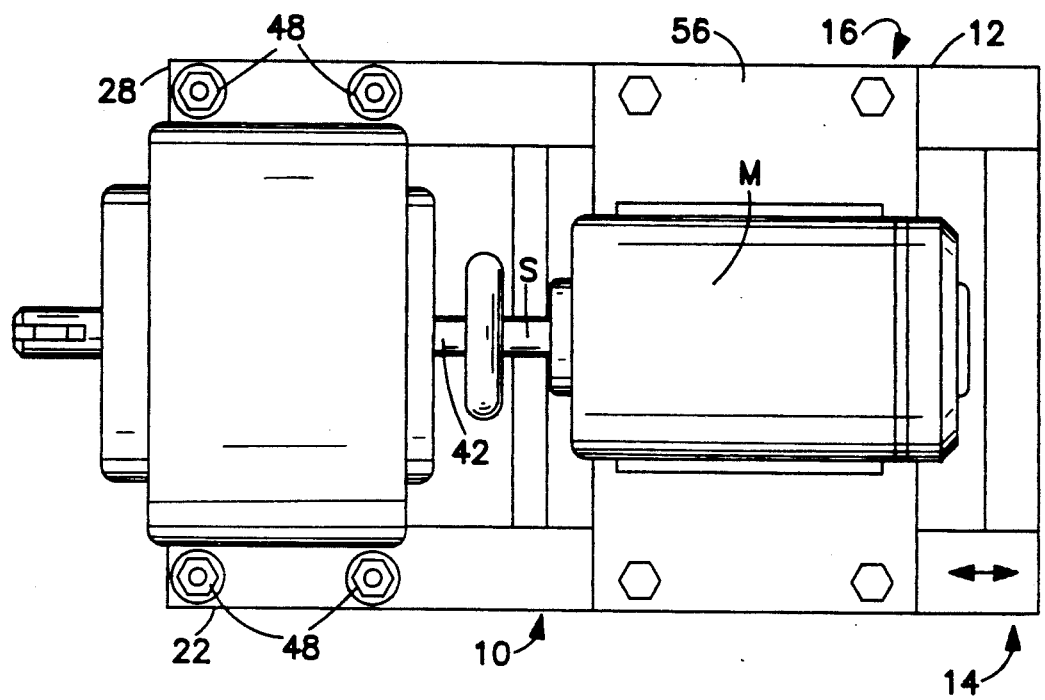
FIG. 3 is a plan view of a mounting means according to the present invention showing a motor and speed control device thereon and at the point of installation.
Figure 4:
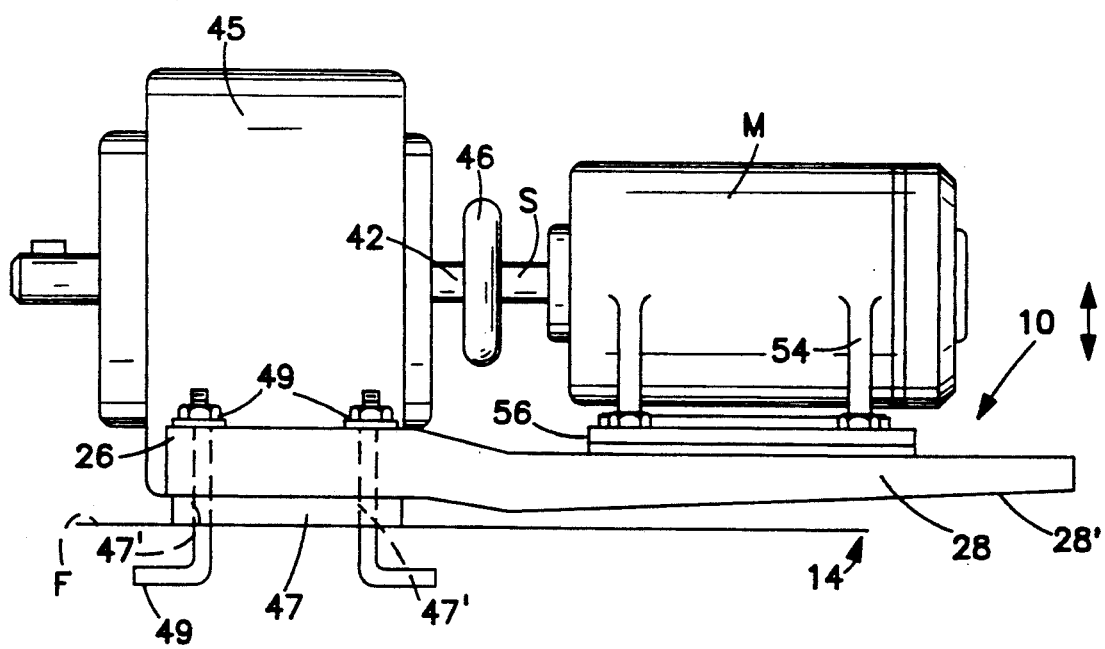
FIG. 4 is an elevational view of the arrangement shown in FIG. 3.

Referring to the Figures, preferred embodiments of the present invention will now be described in detail. A mounting structure according to the present invention is illustrated in FIGS. 1, 3 and 4 generally as 10, and has a drive motor M and a speed control device such as a gear reducer 45 associated therewith. As noted above, in many installations, a drive motor is capable of reaching the resonant frequency of its support structure somewhere in its normal operating speed range. Should the resonant frequency be reached, bearing destruction among other things can result, taking the unit out of operating service. Resonant frequency is, of course, defined by the equation $$f = \sqrt{\frac{K}{M}}$$

where
  f = resonant frequency
  K = a stiffness constant for the mounting or support frame, and
  M = mass of motor and mounting structure The present invention is thus intended to afford a mounting structure to which a drive motor and speed control means may be secured, and under which secured condition, the resonant frequency is neither reached nor transferred to the speed control means.

Figure 2:
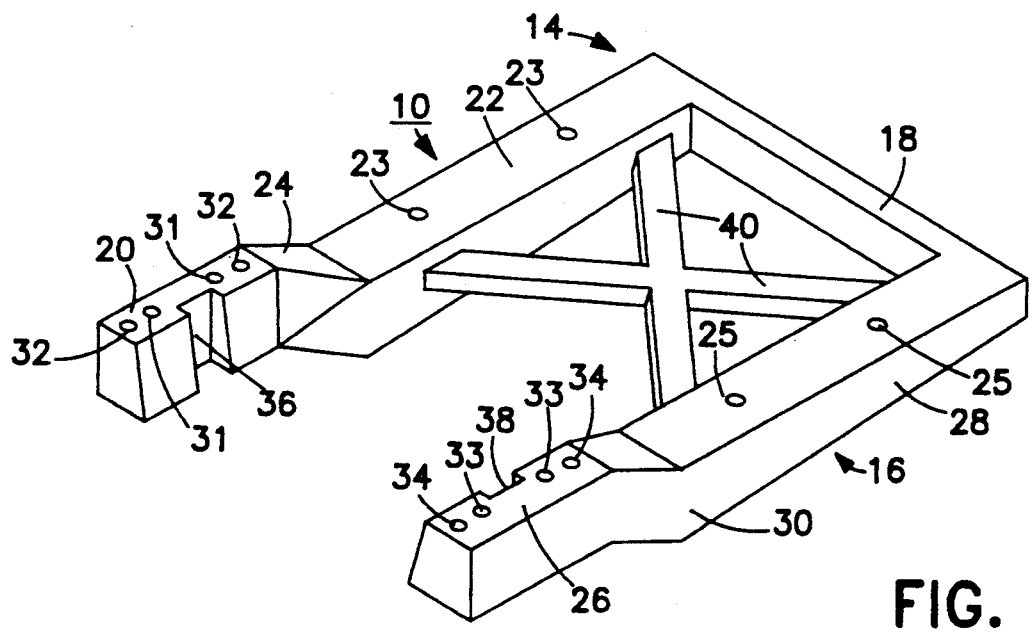
FIG. 2 is an isometric view of a mounting means as illustrated in FIG. 1.

As shown in FIG. 2, a mounting structure according to the present invention is illustrated generally by the reference numeral 10 in the form of a U-shaped yoke or frame which includes parallel and spaced legs or members generally 14 and 16 connected together at one end by a cross-bar 18.

Leg members 14, 16 are normally parallel and are formed with first leg sections 20, 26, respectively, adapted to be received on a floor or other supporting base, such as the base of a speed control device as will be explained hereinafter. Legs 14, 16 have a downwardly angled section 24, 30 adjacent first sections 20, 26 to which are integral second leg sections 22, 28.

Second leg sections 22, 28 thus cantilever from downwardly angled sections 24, 30, and in use are cantilevered therefrom as will be described hereinafter. As shown in FIG. 2, and as is preferred, legs 14, 16 are joined at an outer end of second leg sections 22, 28 by a transverse member or brace 18 if necessary or desirable. Likewise, if necessary or desirable, cross braces 40 may be secured between second leg sections 22, 28 intermediate their length. Second leg sections 22, 28 may also vary in thickness along the length of same, depending upon the weight to be received thereon and the stiffness as may be required (see FIG. 4).

First leg sections 20, 26 define notches or grooves 36, 38, respectively for receipt of an appurtenance of a speed control device thereon. Notches 36, 38, being preformed in the mounting frame according to the present invention afford proper initial orientation of the speed control device as it is mounted on frame 10. In similar fashion, first leg sections 20, 26 define a plurality of pairs of fastening member receiving openings 31, 32, 33, 34, respectively, the purpose of which will be described in detail. Second leg sections likewise define a plurality of fastening member receiving openings 23, 25 for securement of the drive motor thereto.

Upper surfaces of first leg portions 20, 26 are coplanar and define a plane slightly above and parallel to the upper surfaces of second frame leg portions 22 and 28 which also are coplanar.

Making reference now to FIGS. 1, 3 and 4, the preferred mounting frame according to the present invention will be described. FIG. 1, for example illustrates a frame 10 having a speed control device 45 secured thereto. As can be seen, the speed control device 45 which is a gear reducer, has a protuberance 50 on each side (only one shown) which extends upwardly from a base 47 and mates with grooves or notches 36, 38 in first leg sections 20, 26. Bolts 48 are threadably received in pairs of openings 31, 33 to secure gear reducer 45 to frame 10 for transport. In like fashion, motor M may be mounted to frame 10 as shown in FIGS. 3 and 4 for transport. In this arrangement, gear reducer 45, frame 10, and motor M may be conveniently shipped as an assembly.

Thereafter, once the gear reducer 45, frame 10 and Motor M assembly is received at its intended location, and the assembly is properly located in the facility for installation (see FIG. 4), mounting bolts 49, which may be secured in a floor or the like pass up through openings 47' in base 47 of gear reducer 45 and through pairs of openings 32, 34 of frame legs 20, 26, respectively, and receive appropriate washers and nuts thereon to secure frame 10 and gear reducer 45 at the desired location. Still referring to FIG. 4, it can be seen that when installed, base 47 resides on the floor F with first leg sections 20, 26 (only 26 shown) residing thereon and with second leg sections 22, 28 (only 28 shown) being cantilevered outwardly therefrom, and located above floor F. Also as discussed above, a lower surface 22', 28' of second leg sections 22, 28, respectively, (only 28' shown) tapers in decreased thickness toward an outer end of same.

Once the gear reducer—frame assembly is secured at its desired location, a drive motor M, if not already secured to frame 10, may then be secured to frame 10 and operatively associated with the gear reducer 45 via an output shaft S of motor M, a suitable drive coupling 46 and an input shaft 42 of gear reducer 45 (see FIGS. 3 and 4).

Drive motor M has a support structure 54 therefor which may include a mounting plate 56. Relative sizes of motor M and gear reducer 45 will control particular relative locations of same on frame 10 to achieve proper coupling alignment. Consequently, while only one pair of fastening member receiving openings 23, 25 (see FIG. 1) are shown on leg sections 22, 28, a different number of openings or spacings between openings may be provided to afford flexibility for lateral placement of motor M relative to gear reducer 45 indicated by the double headed arrow on FIG. 3 or for attaching different motor sizes. In similar fashion, vertical adjustment of motor M with respect to gear reducer 45 may be varied by the use of shims or other spacers (not shown) as indicated by the vertical double headed arrow on FIG. 4. Also, a mounting plate such as 56 could be first secured between leg section 22, 28 for rigidity of same with motor M secured to plate 56.

While an electric motor M and gear reducer 45 are depicted in the figures and described herein, other drive means and speed control means could be employed as would be within the purview of one skilled in the art, as well as the type of coupling to be employed.

With full installation as illustrated in FIGS. 3 and 4, one can observe that frame 10 is not resting on floor F, but on base 47 of gear reducer 45. With certain speed control devices, however, a base such as 47 may not be provided and legs 20, 26 of frame 10 would be secured to floor F or such other supporting structure as is available. In either event, it can be visualized that second leg sections 22, 28 of frame 10 are unsupported from beneath and are cantilevered from first leg sections 20, 26, but do not rely on support from a housing or the like from gear reducer 45. With such an arrangement, several attendant advantages are present. First, it is not necessary to locate the drive motor and speed control means in an area where both must be securely affixed to an underlying support. Secondly, and most importantly, with an arrangement as described, damage resulting from the motor reaching the resonant frequency of its support structure during its operating range can be avoided. Particularly, second leg sections 22, 28 may be made more or less rigid dependent upon the drive means—speed control means combination to be employed. For example, rigidity of legs 22, 28 may be varied by varying the taper of lower leg surfaces 22', 28'. In like fashion, transverse connector 18 and/or cross struts 40 may or may not be present and may be varied in dimension relative to legs 22, 28.

Hence, the mounting frame according to the present invention may not only serve to afford improved operation of a drive motor speed control means, but also may be shipped fully assembled, and requires less actual support area for installation than other systems. Further, while the arrangement has been described with the motor supported by the cantilevered arm sections 22, 28, such arrangement could be reversed, with the positions of motor and gear reducer reversed as in the figures. In such an alternate arrangement, the motor M would be secured to the floor or other support surface and the gear reducer suspended in cantilever fashion. Mounting frames according to the present invention may be manufactured from any materials that will afford the required strength and rigidity though a metallic structure is preferred, and may be of unitary construction.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. An improved mounting system for a drive means and speed control unit comprising a u-shaped frame having a pair of spaced, parallel leg with free ends, said frame having a first section located in a first plane for securement of a speed control means thereto, said first section defining a plurality of fastening member receiving openings therethrough at said free ends, said first section being adapted to be supported on a portion of said speed control means and attached to a support surface by a plurality of fastening members extending through said fastener member receiving openings and fastener openings in said portion of said speed control means, said frame further having a second section integral with said first section and adapted for securement of the drive means thereto, said second section of said frame being cantilevered from said first section and located in a second plane such that said drive means and said speed control means when secured thereto may be interconnected with individual shafts of same in proper operational alignment.

2. An improved mounting system as defined in claim 1 wherein said legs of said U defining said first and second sections at different locations along the length of same.

3. An improved mounting system as defined in claim 2 wherein said legs of said frame are united at one end only.

4. An improved mounting system as defined in claim 1 wherein said legs being secured at one end to a support member extending therebetween.

5. An improved mounting system as defined in claim 4 wherein said frame is of unitary construction.

6. An improved mounting system as defined in claim 5 wherein end portions of said legs having said support member therebetween are cantilevered from the opposite ends of said legs.

7. An improved mounting system as defined in claim 6 wherein said legs define said first section adjacent an open end of same and said second section is cantilevered therefrom.

* * * * *